No. 842,587. PATENTED JAN. 29, 1907.
M. & C. SKOGSTAD.
PULLEY CLUTCH.
APPLICATION FILED MAY 14, 1906.

Witnesses.
E. W. Jeppson
Melie Hoel

Inventors.
Clarence Skogstad.
Martin Skogstad.
By their Attorneys.
Williamson & Merchant

UNITED STATES PATENT OFFICE.

MARTIN SKOGSTAD AND CLARENCE SKOGSTAD, OF GRAND MEADOW, MINNESOTA.

PULLEY-CLUTCH.

No. 842,587.  Specification of Letters Patent.  Patented Jan. 29, 1907

Application filed May 14, 1906. Serial No. 316,650.

*To all whom it may concern:*

Be it known that we, MARTIN SKOGSTAD and CLARENCE SKOGSTAD, citizens of the United States, residing at Grand Meadow, in the county of Mower and State of Minnesota, have invented certain new and useful Improvements in Pulley-Clutches; and we do hereby declare the following to be a full, clear, and exact description of the invention, such as will enable others skilled in the art to which it appertains to make and use the same.

Our invention has for its object to provide an improved one-way pulley and shaft coupling or clutch; and to this end it consists of the novel devices and combinations of devices hereinafter described, and defined in the claim.

In the accompanying drawings, which illustrate our invention, like characters indicate like parts throughout the several views.

Figure 1:
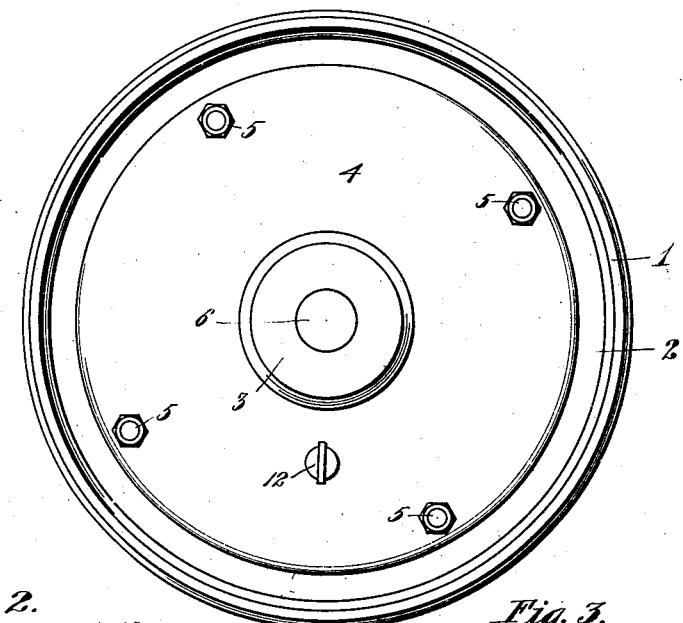
Figure 2:
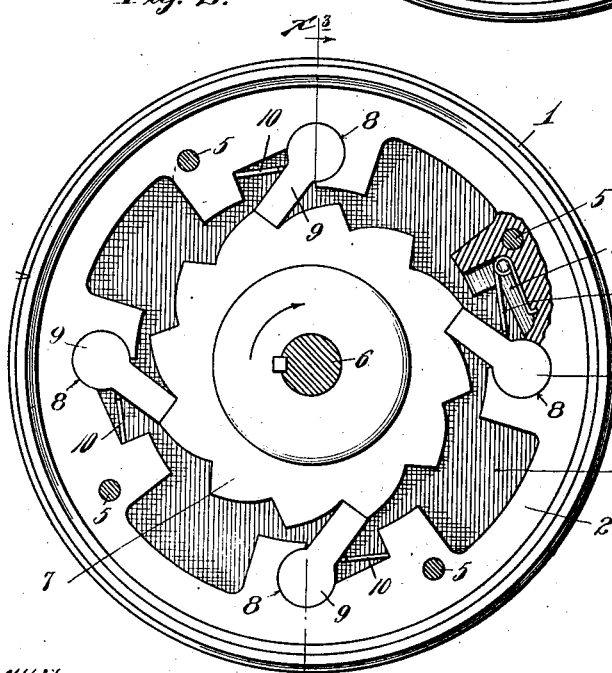
Figure 3:
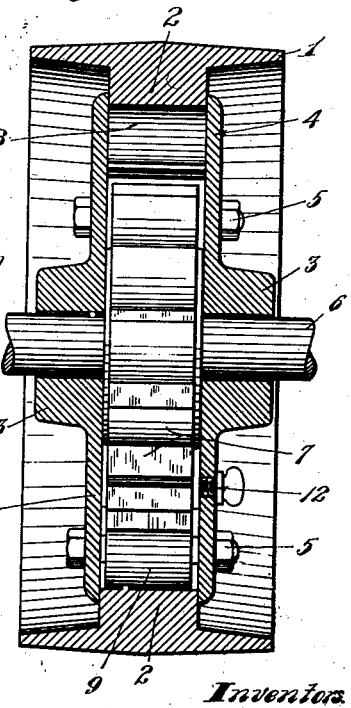

Referring to the drawings, Figure 1 is a view in side elevation showing a pulley equipped with one of our improved couplings. Fig. 2 is a side elevation of the said pulley and coupling with one plate of the pulley removed; and Fig. 3 is a vertical section through the pulley and clutch on the line $x^3$ $x^3$ of Fig. 2, some parts being shown in full.

The numeral 1 indicates a pulley-rim, which is formed with a central internal rib or flange 2. The hub 3 of the pulley is made up of laterally-spaced sections, each of which is integrally formed with or rigidly secured to a disk-like side plate 4. These side plates 4 at their margins bear against the opposite faces of the rib 2 and are rigidly, but detachably secured thereto by nutted bolts 5. The hub-sections 3 run loosely upon a shaft 6. A ratchet-wheel 7, which is keyed or otherwise rigidly secured to the shaft 6, is located between the side plates 4 and is entirely incased thereby and by the pulley-rim. The internal flange 2 of the pulley-rim 1 is formed with seats 8, in which are loosely pivoted clutch-dogs 9, that coöperate with the teeth of the ratchet-wheel 7 and are yieldingly held in engagement therewith by springs 10, shown as mounted in suitable seats 11, also formed in the said rib 2. It will thus be seen that all of the frictionally-engaging parts of the clutch—to wit, the ratchet-wheel 7, the dogs or pawls 9, and the springs 10—are inclosed within a casing made up of the side plates and rim of the pulley. This inclosed space may contain a large amount of oil, so that the said frictionally-engaging parts will be caused to run or work in the oil. In order that oil may be readily inserted into the said space or chamber, one of the side plates 4 is shown as provided with a normally plugged oil-hole 12, which when opened will permit the tip of an oil-can to be inserted into the said chamber.

If the shaft 6 be assumed to be the driving member and to be rotated in the direction of the arrow marked adjacent thereon on Fig. 2, the pulley will be positively driven in the same direction; but if the shaft be suddenly stopped or retarded in movement the said pulley will be permitted to freely run ahead of said shaft in the direction indicated under the momentum which said pulley and other parts driven therefrom may have acquired. If the pulley be the driving member, then the action above described will be reversed—that is, the pulley being rotated in the direction opposite to that shown by the arrow in Fig. 2 the shaft will be positively driven in the same direction and will be permitted to run ahead of said pulley in that direction.

A device of the above kind is adapted for a great many different uses. It is adapted for use at different places on the threshing-machine and is particularly adapted for application in the driving mechanism to the fan or blower, with the said clutch so arranged that the blower or fan may continue to run under acquired momentum when the threshing-cylinder and other parts of the separator are suddenly stopped or slowed down.

The device described is of small cost and is sufficient for the purposes had in view. The device is dust and moisture proof, and hence will last for a long time.

We claim as our invention—

The combination with a pulley-rim 1 having an internal rib 2, of the separable side plates 4 embracing said rib 2, a plurality of nutted bolts passed through said two plates 4 and the intermediate rib 2, and rigidly but detachably connecting the same, said plates having hub portions 3, a shaft 6 loosely journaled to the hubs 3, a ratchet-wheel 7 secured to said shaft and working in the space between said side plates 4, and a plurality of spring-pressed clutch-dogs mounted in the seats formed in said rib 2 and engageable with the teeth of said ratchet-wheel 7, said side plates and pulley-rim affording a chamber inclosing the frictionally-engaging parts of the clutch, substantially as described.

In testimony whereof we affix our signatures in presence of two witnesses.

MARTIN SKOGSTAD.
CLARENCE SKOGSTAD.

Witnesses:
P. SCHLEIYER,
A. F. SCHLEIYER.